United States Patent
Brates et al.

(10) Patent No.: US 7,339,330 B2
(45) Date of Patent: Mar. 4, 2008

(54) METHODS AND CIRCUITS FOR INSTANT HOT RESTART OF HIGH INTENSITY DISCHARGE LAMPS

(75) Inventors: Nanu Brates, Winchester, MA (US); Jakob Maya, Brookline, MA (US); John C. Chamberlain, Somerville, MA (US); Shinichi Anami, Wellesley, MA (US)

(73) Assignee: Matsushita Electric Works Ltd., Osaka (JP)

( * ) Notice: Subject to any disclaimer, the term of this patent is extended or adjusted under 35 U.S.C. 154(b) by 0 days.

(21) Appl. No.: 11/294,946

(22) Filed: Dec. 6, 2005

(65) Prior Publication Data

US 2007/0126371 A1  Jun. 7, 2007

(51) Int. Cl.
*H05B 37/00* (2006.01)
(52) U.S. Cl. ............... 315/289; 315/290; 315/246; 315/291; 315/209 CD; 315/209 R; 315/DIG. 5
(58) Field of Classification Search ............ 315/209 R, 315/246, 276, 278, 289–291, 209 CD, DIG. 5, 315/DIG. 7
See application file for complete search history.

(56) References Cited

U.S. PATENT DOCUMENTS

| | | | | |
|---|---|---|---|---|
| 4,048,539 A | * | 9/1977 | Walker et al. | ............... 315/176 |
| 4,103,209 A | | 7/1978 | Elms | |
| 4,350,930 A | * | 9/1982 | Peil et al. | ...................... 315/49 |
| 4,455,510 A | * | 6/1984 | Lesko | ......... 315/263 |
| 4,529,914 A | * | 7/1985 | Kaneda | ...................... 315/335 |
| 4,714,862 A | * | 12/1987 | Dannert et al. | ............. 315/244 |
| 5,449,980 A | * | 9/1995 | Kiefer et al. | ............... 315/240 |
| 5,572,093 A | | 11/1996 | Kiefer | |
| 5,677,602 A | * | 10/1997 | Paul et al. | .................. 315/224 |
| 5,990,633 A | * | 11/1999 | Hirschmann et al. | ....... 315/289 |
| 6,191,537 B1 | * | 2/2001 | Celso | ........................ 315/219 |

* cited by examiner

*Primary Examiner*—Haissa Philogene
(74) *Attorney, Agent, or Firm*—Wolf, Greenfield & Sacks P.C.

(57) ABSTRACT

A lamp ballast for operating a high intensity discharge lamp includes an electronic ballast circuit to supply an operating voltage to the discharge lamp, and an igniter circuit to supply starting pulses to the discharge lamp in a cold state and to supply hot restrike pulses to the discharge lamp when the discharge lamp is in a hot state following turn-off. The hot restrike pulses are sufficient to maintain ionization in the discharge lamp but do not cause the discharge lamp to generate substantial light output.

19 Claims, 6 Drawing Sheets

| FIG. 3A | FIG. 3B |
|---|---|
| FIG. 3A | |

METHODS AND CIRCUITS FOR INSTANT HOT RESTART OF HIGH INTENSITY DISCHARGE LAMPS

FIELD OF THE INVENTION

This invention relates to high intensity discharge lamp systems and, more particularly, to methods and circuits for instant restart of hot high intensity discharge lamps after the lamp is turned off.

BACKGROUND OF THE INVENTION

High intensity discharge (HID) lamp, such as metal halide discharge lamps, are characterized by high efficacy and superior color rendering index, and are widely used for general lighting. Although an HID lamp has distinct advantages, it has the significant shortcoming that hot restrike or restart is very difficult and inhibits rapid on and off operation. One of the reasons for the difficulty in hot restarting is that the pressure in the arc tube remains very high when the lamp is extinguished. In the conventional HID lamp ballast, no power is applied to the lamp after the lamp is turned off. Consequently, ionization of the gas within the arc tube stops. Restarting of the lamp requires a hot restrike voltage of several tens of kilovolts.

A typical HID lamp, energized by a ballast without instant restrike circuitry, requires a delay of more than five minutes to restart the hot lamp. In many applications, the time delay during the cooling cycle is acceptable. In some applications, such as emergency lighting, projection, graphic arts and stadium lighting, as well as when the lamp is coupled to an occupancy sensor, the cooling delays are unacceptable.

Relighting of the lamp requires a hot restrike voltage of several tens of kilovolts applied to the lamp for relighting. The high voltage requirement is due to the high gas pressure, mainly mercury and metal halide salts vapor, present in the arc tube after the lamp is turned off. To restart the lamp without very high voltages, it has been necessary to wait for the arc tube to cool down such that the gas pressure decreases to a low enough value for a standard ballast to start the lamp. Use of high voltages requires special fittings or fixtures, and special insulation for power cables. Accordingly, reduction of the high voltage requirements for hot restarting of HID lamps would be beneficial for fixture manufacturers.

U.S. Pat. No. 4,455,510, issued Jun. 19, 1984 to Lesko, discloses a high intensity discharge ballast which includes a capacitive discharge network that produces initial breakdown of hot HID lamps. However, relighting of the lamp requires a hot restrike voltage of several tens of kilovolts.

U.S. Pat. No. 4,529,914, issued Jul. 16, 1985 to Kaneda, discloses a high intensity discharge lamp having an arc tube including a pair of main electrodes and at least one auxiliary electrode or probe. A high frequency, high voltage is applied to the probe for forming a high frequency ignition discharge for establishing a low frequency arc discharge between the main electrodes. Ignition and hot restrike can be achieved by applying through the outer leads a superimposed voltage including the source voltage and the high frequency, high voltage. A drawback of the disclosed lamp is the requirement for a specially designed arc tube that includes an auxiliary electrode or probe. This approach cannot be utilized with standard two-electrode discharge lamps.

U.S. Pat. No. 6,191,537, issued Feb. 20, 2001 to Celso, discloses a solid state igniter device for hot restrike of discharge lamps with an associated supply circuit. The circuit does not produce pulses after the lamp is de-energized, such that relighting of the lamp requires hot restrike voltage pulses of several tens of kilovolts.

Accordingly, there is a need for improved methods and circuits for instant hot restart of high intensity discharge lamps.

SUMMARY OF THE INVENTION

According to a first aspect of the invention, a lamp ballast is provided for operating a high intensity discharge lamp. The lamp ballast comprises an electronic ballast circuit to supply an operating voltage to the discharge lamp, and an igniter circuit to supply starting pulses to the discharge lamp in a cold state and to supply hot restrike pulses to the discharge lamp when the discharge lamp is in a hot state following turn-off.

According to a second aspect of the invention, a method is provided for hot restart of a high intensity discharge lamp. The method comprises, when the discharge lamp is in a hot state following turn-off, supplying to the discharge lamp hot restrike pulses sufficient to maintain ionization within the discharge lamp, and restarting the hot discharge lamp.

According to a third aspect of the invention, a lighting system comprises a high intensity discharge lamp having an arc discharge chamber with electrodes at each end, and a lamp ballast configured to supply electrical energy to the discharge lamp. The lamp ballast comprises an electronic ballast circuit to supply an operating voltage to the discharge lamp, and an igniter circuit to provide starting pulses to the discharge lamp and to supply hot restrike pulses to the discharge lamp when the discharge lamp is in a hot state following turn-off.

BRIEF DESCRIPTION OF THE DRAWINGS

For a better understanding of the present invention, reference is made to the accompanying drawings, which are incorporated herein by reference and in which.

DETAILED DESCRIPTION

Figure 1:
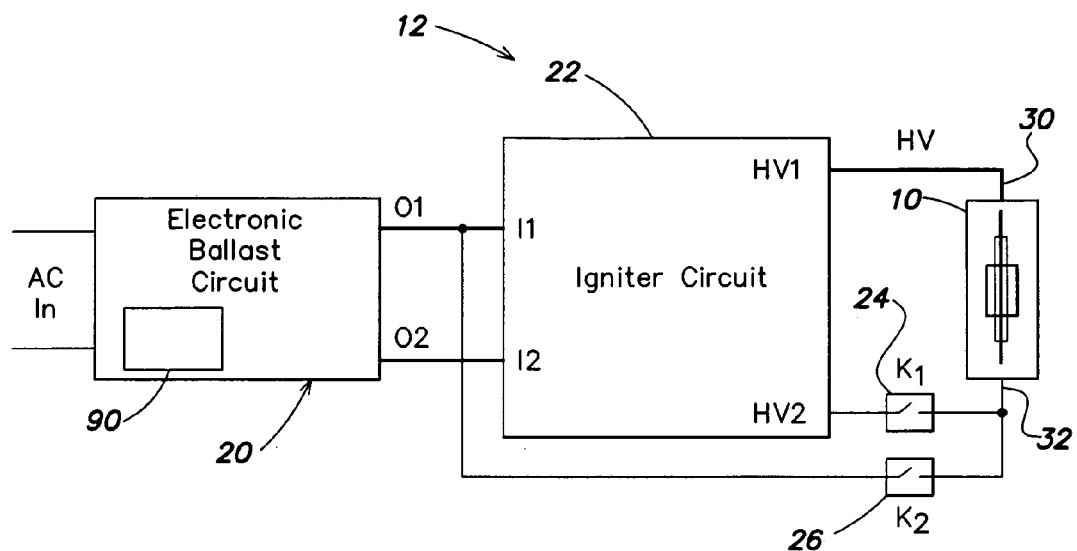
FIG. 1 is a schematic block diagram of a high intensity discharge lamp system in accordance with an embodiment of the invention.

A schematic block diagram of a high intensity discharge lamp system in accordance with an embodiment of the invention is shown in FIG. 1. The lamp system includes a high intensity discharge lamp 10 and a lamp ballast 12 connected to HID lamp 10. Lamp ballast 12 includes an electronic ballast circuit 20, an igniter circuit 22 and switches 24 and 26.

Electronic ballast circuit 20 receives AC input power, such as 120 volts, 60 cycles, and supplies lamp operating power on outputs O1 and O2. Ballast circuit outputs O1 and O2 are connected to inputs I1 and I2, respectively, of igniter circuit 22. A first output HV1 of igniter circuit 22 is connected to a first lead 30 of HID lamp 10, and a second output HV2 of igniter circuit 22 is connected through switch 24 to a second lead 32 of HID lamp 10. Lead 32 of HID lamp 10 is connected through switch 26 to output O1 of electronic ballast circuit 20.

HID lamp 10 may be a metal halide lamp, a high pressure sodium lamp, or an ultra high pressure mercury lamp, for example. Both quartz and ceramic discharge lamps may be utilized. Such discharge lamps typically include an arc discharge tube of a light-transmissive material enclosing a fill material that supports a light-emitting discharge. Electrodes are mounted in opposite ends of the arc tube. The discharge tube may be mounted in a bulbous lamp envelope having a lamp base. Lead-in wires extend from the lamp base to the electrodes of the discharge tube. The construction of HID lamps is well known to those skilled in the art and is not described in detail herein.

Figure 2:
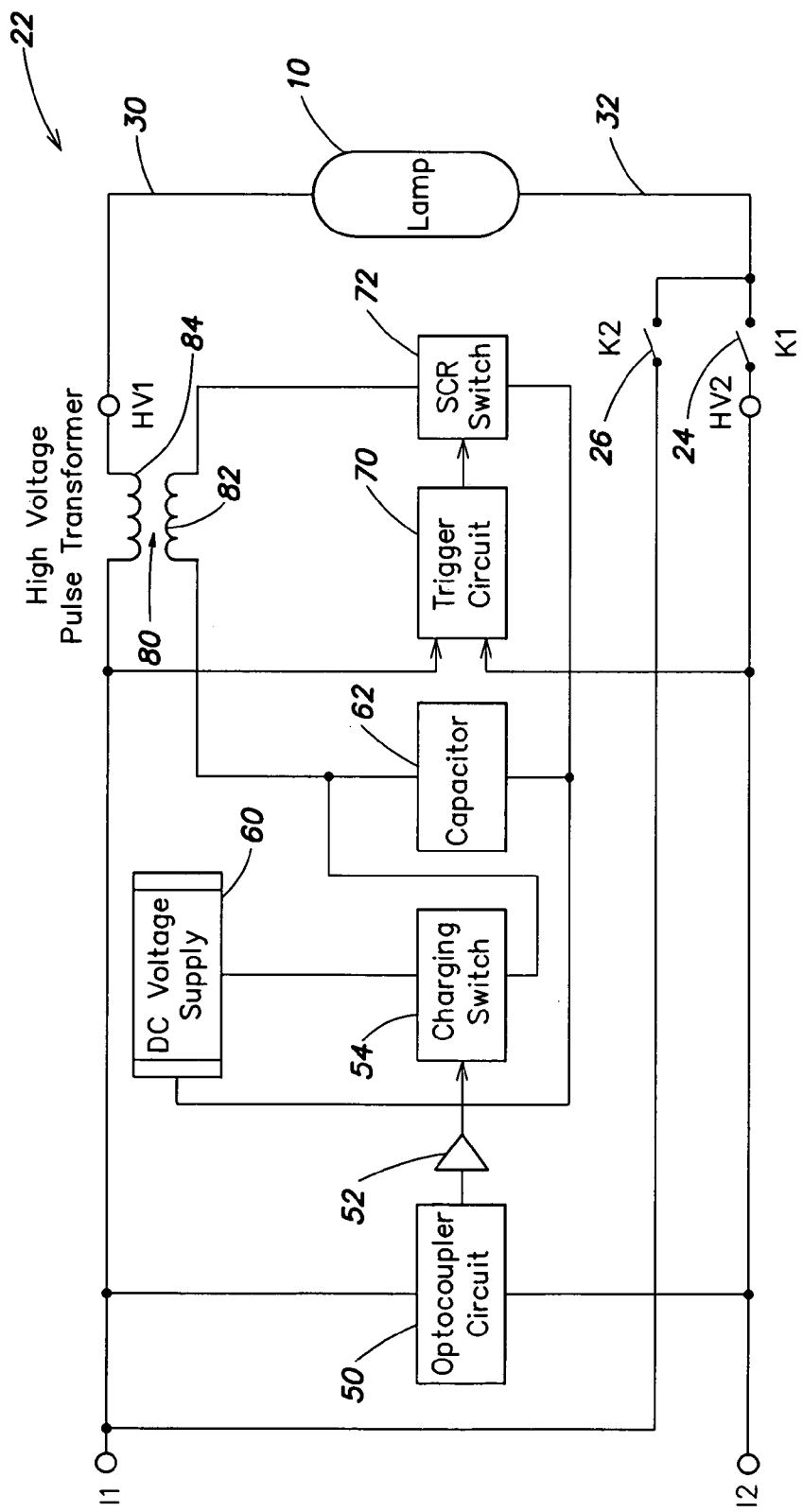
FIG. 2 is a block diagram of an igniter circuit in accordance with an embodiment of the invention.

A block diagram of igniter circuit 22 is shown in FIG. 2. Igniter circuit 22 includes an opto-coupler circuit 50, a logic circuit 52, a charging switch 54, such as an FET, a DC voltage supply 60, a capacitor 62, a trigger circuit 70, an electronic switch 72, such as an SCR, and a high voltage pulse transformer 80. Igniter circuit 22 supplies pulses for starting HID lamp 10 from a cold state. In addition, igniter circuit 22 supplies hot restrike pulses to HID lamp 10 following lamp turnoff to permit hot restrike as described below.

To turn off HID lamp 10, switch 24 is opened and switch 26 is closed. By connecting both leads 30 and 32 of HID lamp 10 to ballast circuit output O1, no current is delivered to the lamp by electronic ballast circuit 20 and the lamp turns off. Simultaneously, pulses are applied to lead 30 of HID lamp 10. It has been discovered that by applying repetitive voltage pulses after the lamp is turned off, discharge column ionization is maintained during the power off period. As a result, the magnitude of the high voltage pulses required to restart the hot lamp is reduced. The energy delivered by the pulses is low, such that little or no light is produced and the lamp appears to be turned off.

To start HID lamp 10 from a cold condition, electronic ballast circuit 20 is energized and switch 26 is opened. An alternating polarity voltage signal, having an amplitude on the order of 300 volts, generated by ballast circuit 20 is applied to inputs I1 and I2 of igniter circuit 22. The signal generated by ballast circuit 20 may be a square wave but is not limited to a square wave. The frequency may be in a range of 100 Hz to 400 Hz. When the ballast circuit output voltage becomes positive, opto-coupler circuit 50 and logic circuit 52 generate a drive signal to turn on charging switch 54. Upon closing charging switch 54, DC voltage supply 60 charges capacitor 62 to a preset voltage $V_{DC1}$. By way of example, the preset voltage $V_{DC1}$ may be 400 volts for a 70 watt ceramic metal halide lamp. When capacitor 62 is fully charged to the preset voltage, switch 54 is turned off, thus disconnecting one lead of capacitor 62 from DC voltage supply 60. The charging time of capacitor 62 is less than ½f, where f is the output frequency of ballast circuit 20. When the open circuit output voltage of ballast circuit 20 changes polarity from the positive to negative at inputs I1 and I2, trigger circuit 70 turns on electronic switch 72. When switch 72 is turned on, capacitor 62 discharges through a primary winding 82 of high voltage pulse transformer 80 and a high voltage pulse is generated across a secondary winding 84 of pulse transformer 80. The high voltage pulse is applied to output HV1 and is superimposed on the open circuit voltage of ballast circuit 20. Breakdown of the cold starting gas inside HID lamp 10 leads to lamps starting. When HID lamp starts, the RMS voltage at igniter circuit inputs I1 and I2 falls below the open circuit value. As a result, trigger circuit 70 stops operating and high voltage pulses are no longer generated at secondary winding 84 of pulse transformer 80.

Turn-off of HID lamp 10 involves the following operations. When switch 24 is opened, the current return path to output O2 of ballast circuit 20 is interrupted and discharge lamp 10 is turned off, with no light being generated. Simultaneously with opening switch 24, switch 26 is closed. The output voltage of ballast circuit 20 returns to its open circuit value, and trigger circuit 70 is reactivated. As a result, high voltage pulses are generated at the secondary winding 84 of pulse transformer 80 every cycle of the output voltage of ballast circuit 20. The high voltage pulses produce ionization in hot HID lamp 10. By way of example, the hot restrike pulses applied to the hot HID lamp may have a pulse width of 100-400 nanoseconds and an amplitude of 7 to 15 kilovolts, but the pulse parameters are not limited to these ranges. The energy delivered to the discharge is sufficient to generate a discharge streamer, thus maintaining hot gas ionization but is not sufficient for the discharge to generate intense light. Pulse generation continues until HID lamp 10 is turned on again or until a timing circuit 90 in ballast circuit 20 turns off the output voltage of ballast circuit 20, thus de-energizing igniter circuit 22. Timing circuit 90, may for example, have a timing period of 5 minutes, sufficient to return HID lamp 10 to a cold start condition.

Figure 3A:
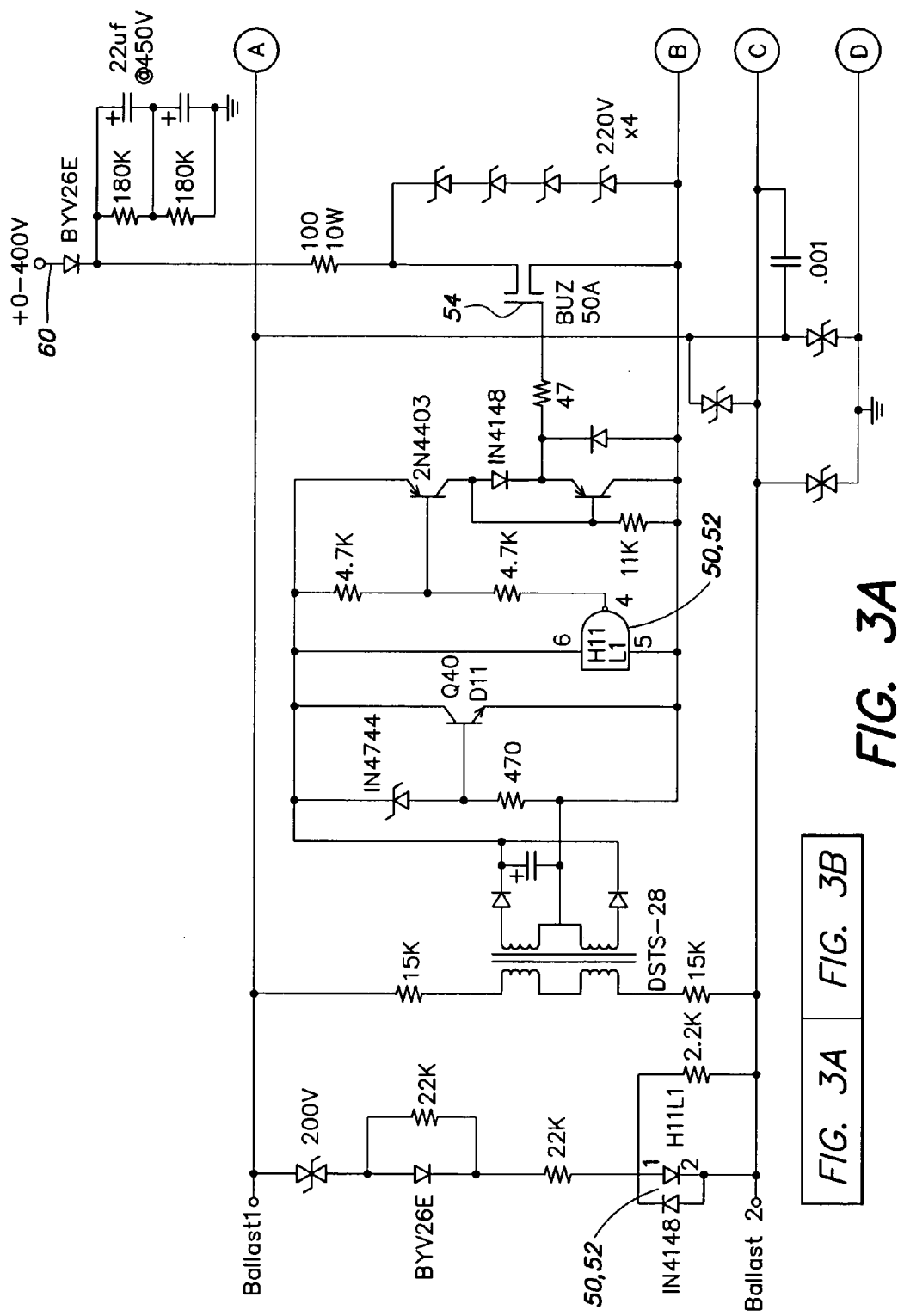
FIG. 3 is a schematic diagram of an igniter circuit in accordance with an embodiment of the invention.
Figure 3B:
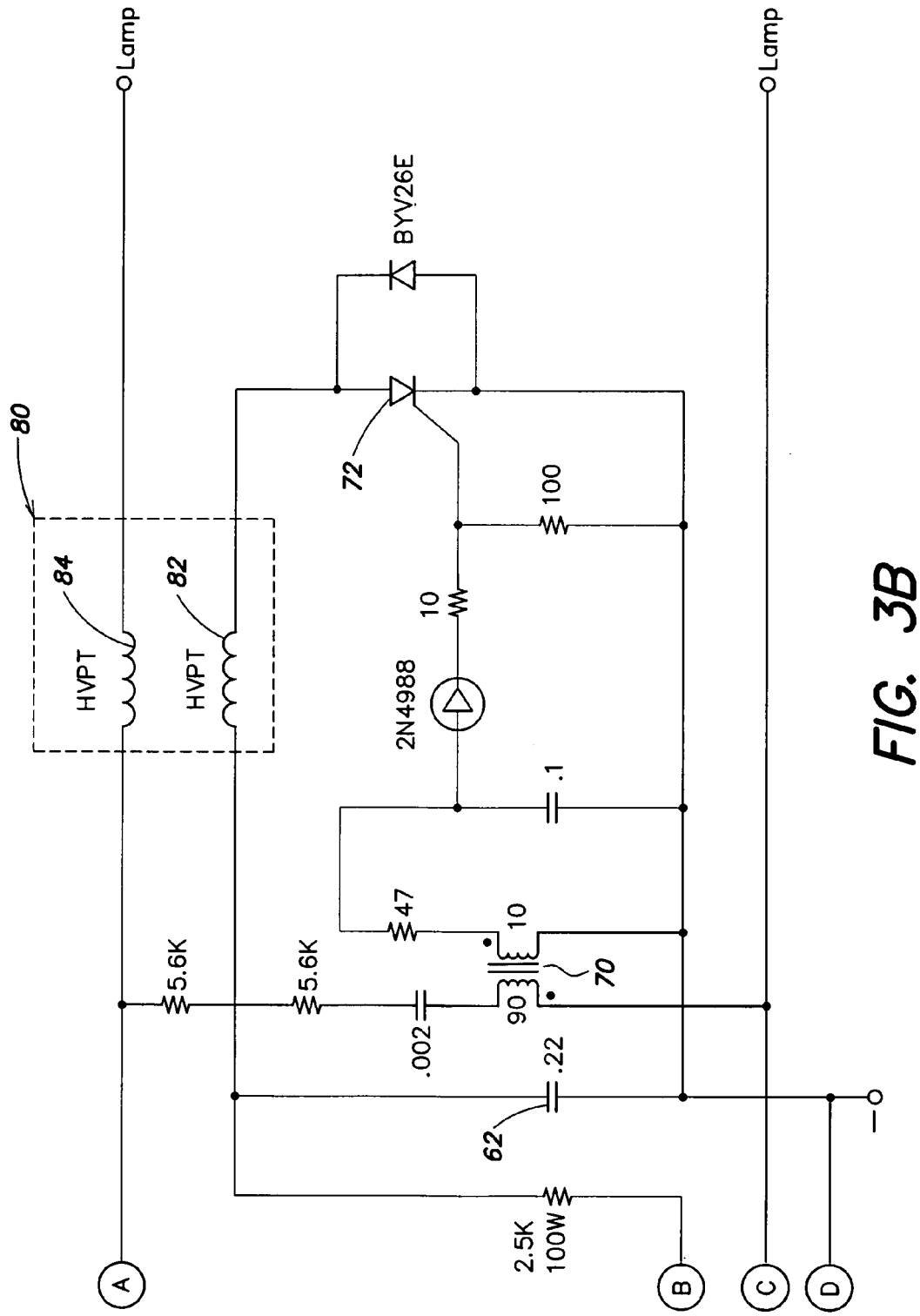

An implementation of igniter circuit 22 is shown in FIG. 3. Like elements in FIGS. 2 and 3 have the same reference numerals. It will be understood that the circuit shown in FIG. 3 is given by way of example only and is not limiting as to the scope of the present invention.

Figure 4A:
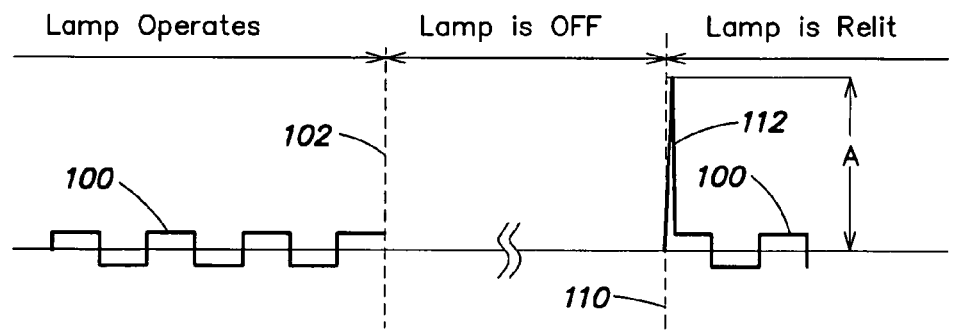
FIG. 4A illustrates waveforms associated with hot restrike according to the prior art.

A timing diagram that illustrates operation of an HID lamp in accordance with prior art techniques is shown in FIG. 4A. Ballast output voltage 100, typically a square wave, is applied to the lamp during normal operation. At turn-off time 102 the ballast circuit is de-energized and no voltage is applied to the hot HID lamp. At hot restrike time 110, the HID lamp is still hot and a hot restrike pulse 112 having an amplitude A of several tens of kilovolts is applied to the HID lamp for restarting.

Figure 4B:
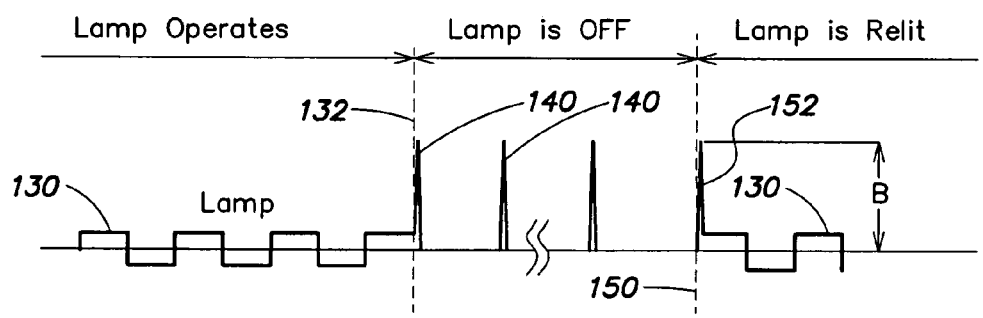
FIG. 4B illustrates waveforms associated with hot restrike according to an embodiment of the invention.

A timing diagram that illustrates hot restrike operation in accordance with an embodiment of the invention is shown in FIG. 4B. Ballast output voltage 130, typically a square wave, is applied to the HID lamp during normal operation. At turn-off time 132, the ballast output voltage 130 is no longer applied to the HID lamp. Instead, hot restrike pulses 140 are applied to the hot HID lamp as described above. The hot restrike pulses 140 maintain ionization within the arc tube of the HID lamp but do not cause the HID lamp to generate light. At hot restrike time 150, an ignition pulse 152 is applied to the HID lamp superimposed on the ballast output voltage 130. Because ionization has been maintained in the hot HID lamp, an amplitude B of ignition pulse 152 is smaller than the amplitude A of ignition pulse 112 shown in FIG. 4A.

Figure 5:
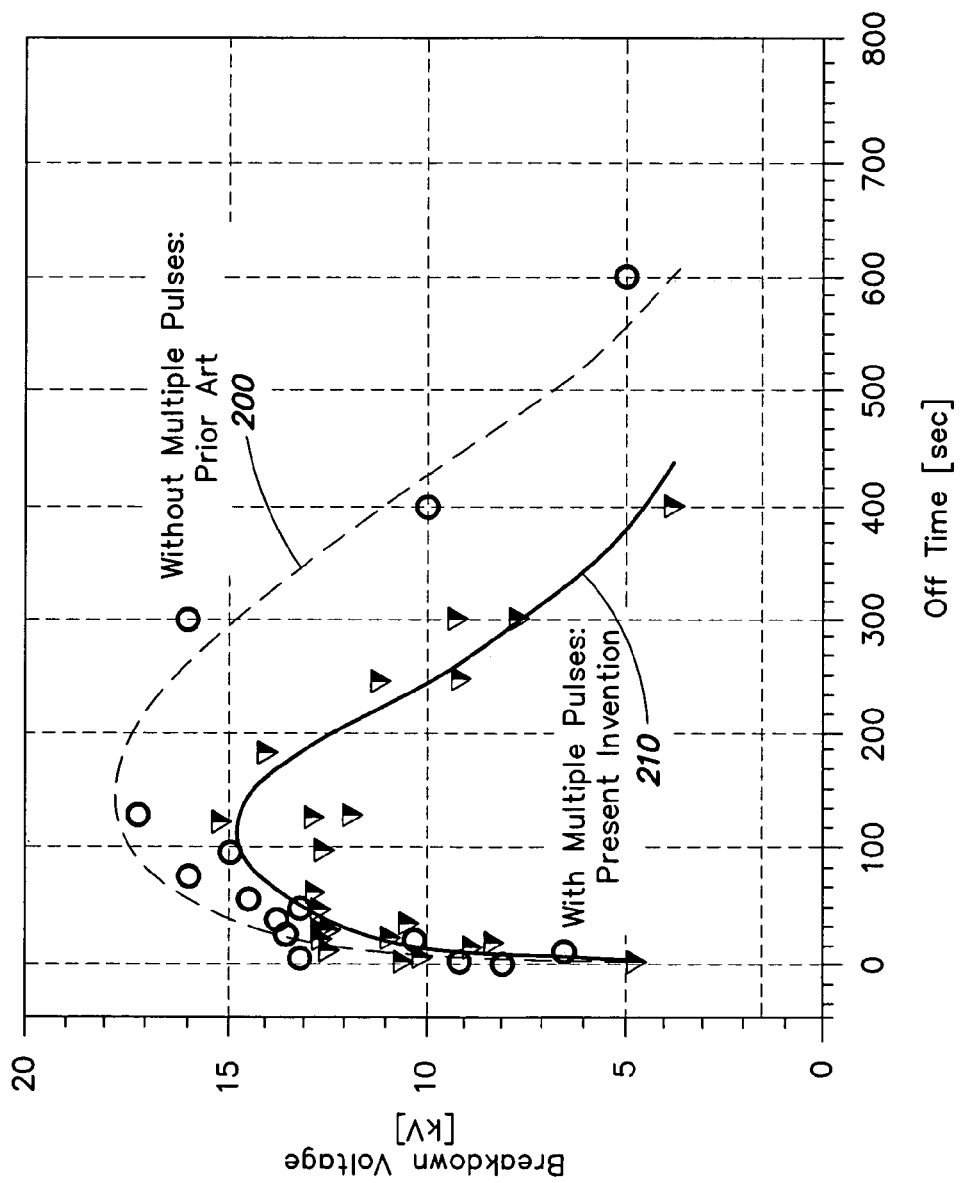
FIG. 5 is a graph of discharge lamp breakdown voltage as a function of time after turn-off, according to the present invention and according to the prior art.

A graph of breakdown voltage of the HID lamp as a function of off time after turn-off is shown in FIG. 5. Curve 200 represents prior art operation, as shown in FIG. 4A and described above, wherein no voltage is applied to the hot discharge lamp after turn-off. Curve 210 represents operation according to an embodiment of the invention, as shown in FIG. 4B and described above, wherein hot restrike pulses sufficient to maintain ionization are applied to the hot HID lamp after turn-off. It may be observed that the breakdown voltage of curve 210 is substantially lower than the breakdown voltage of curve 200.

Having described several embodiments and an example of the invention in detail, various modifications and improvements will readily occur to those skilled in the art. Such modifications and improvements are intended to be within the spirit and the scope of the invention. Furthermore, those skilled in the art would readily appreciate that all parameters listed herein are meant to be exemplary and that actual parameters will depend upon the specific application for which the system of the present invention is used. Accordingly, the foregoing description is by way of example only and is not intended as limiting. The invention is limited only as defined by the following claims and their equivalents.

What is claimed is:

1. A lamp ballast for operating a high intensity discharge lamp, comprising:
   an electronic ballast circuit to supply an operating voltage to the discharge lamp; and
   an igniter circuit to supply starting pulses to the discharge lamp in a cold state and to supply hot restrike pulses to maintain ionization in the discharge lamp when the discharge lamp is in a hot state following turn-off and the operating voltage is not being supplied to the discharge lamp by the electronic ballast circuit.

2. A lamp ballast as defined in claim 1, wherein the igniter circuit is configured to supply low duty cycle, short duration hot restrike pulses that are sufficient to maintain a discharge streamer in the discharge lamp.

3. A lamp ballast as defined in claim 1, wherein the igniter circuit is configured to supply hot restrike pulses that do not cause the discharge lamp to generate substantial light output.

4. A lamp ballast as defined in claim 1, further comprising a timing circuit to disable the igniter circuit from supplying hot restrike pulses after a timing period.

5. A lamp ballast as defined in claim 1, further comprising one or more switching elements to disable the ballast circuit from supplying the operating voltage to the discharge lamp following turn-off and to enable the ballast circuit to supply an open circuit output voltage to the igniter circuit after the discharge lamp is turned off.

6. A lamp ballast as defined in claim 5, wherein the hot restrike pulses are synchronized to the open circuit output voltage of the ballast circuit.

7. A method for hot restart of a high intensity discharge lamp, comprising:
   when the discharge lamp is in a hot state following turn-off and an operating voltage is not being supplied to the discharge lamp, supplying to the discharge lamp hot restrike pulses sufficient to maintain ionization within the discharge lamp; and
   restarting the hot discharge lamp.

8. A method as defined in claim 7, wherein supplying hot restrike pulses comprises supplying low duty cycle, short duration hot restrike pulses that are sufficient to maintain a discharge streamer in the discharge lamp.

9. A method as defined in claim 7, wherein supplying hot restrike pulses comprises supplying pulses that do not cause the discharge lamp to produce substantial light output.

10. A method as defined in claim 7, further comprising disabling the hot restrike pulses after a timing period.

11. A method as defined in claim 7, further comprising disconnecting the operating voltage from the discharge lamp when the discharge lamp is turned off.

12. A method as defined in claim 7, wherein supplying hot restrike pulses comprises synchronizing the hot restrike pulses to an open circuit operating voltage.

13. A lighting system comprising:
    a high intensity discharge lamp having an arc discharge chamber with electrodes at each end; and
    a lamp ballast configured to supply electrical energy to the discharge lamp, the lamp ballast comprising an electronic ballast circuit to supply an operating voltage to the discharge lamp, and an igniter circuit to provide starting pulses to the discharge lamp in a cold state and to supply hot restrike pulses to maintain ionization in the discharge lamp when the discharge lamp is in a hot state following turn-off and the operating voltage is not being supplied to the discharge lamp by the electronic ballast circuit.

14. A lighting system as defined in claim 13, wherein the lamp ballast further comprises a timing circuit to disable the igniter circuit from supplying hot restrike pulses after a timing period.

15. A lighting system as defined in claim 13, wherein the igniter circuit is configured to supply low duty cycle, short duration hot restrike pulses that are sufficient to maintain a discharge streamer in the discharge lamp.

16. A lighting system as defined in claim 13, wherein the lamp ballast further comprises one or more switches to disconnect the operating voltage from the discharge lamp following turn-off and to connect an open circuit output voltage of the ballast circuit to the igniter circuit following turn-off.

17. A lighting system as defined in claim 16, wherein the hot restrike pulses are synchronized to the open circuit output voltage of the ballast circuit.

18. A lighting system as defined in claim 13, wherein the operating voltage comprises a square wave.

19. A lighting system as defined in claim 13, wherein the high intensity discharge lamp comprises a metal halide lamp.

* * * * *